Feb. 7, 1933.  W. E. S. DYER  1,896,225
EXPANSION EQUALIZING MEANS FOR PIPE JUNCTURES
Filed April 18, 1931
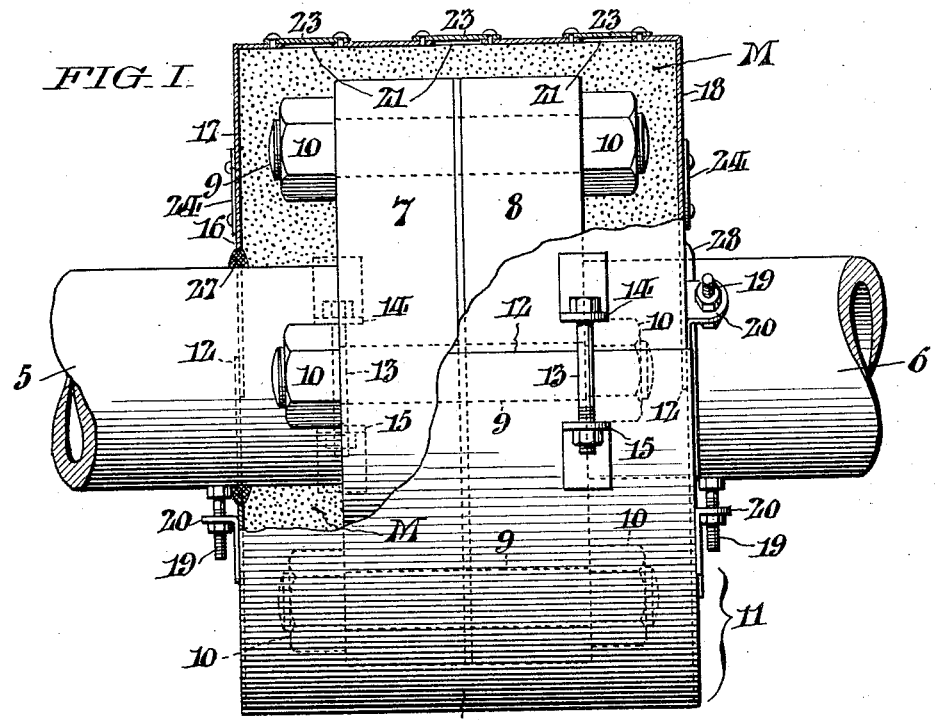
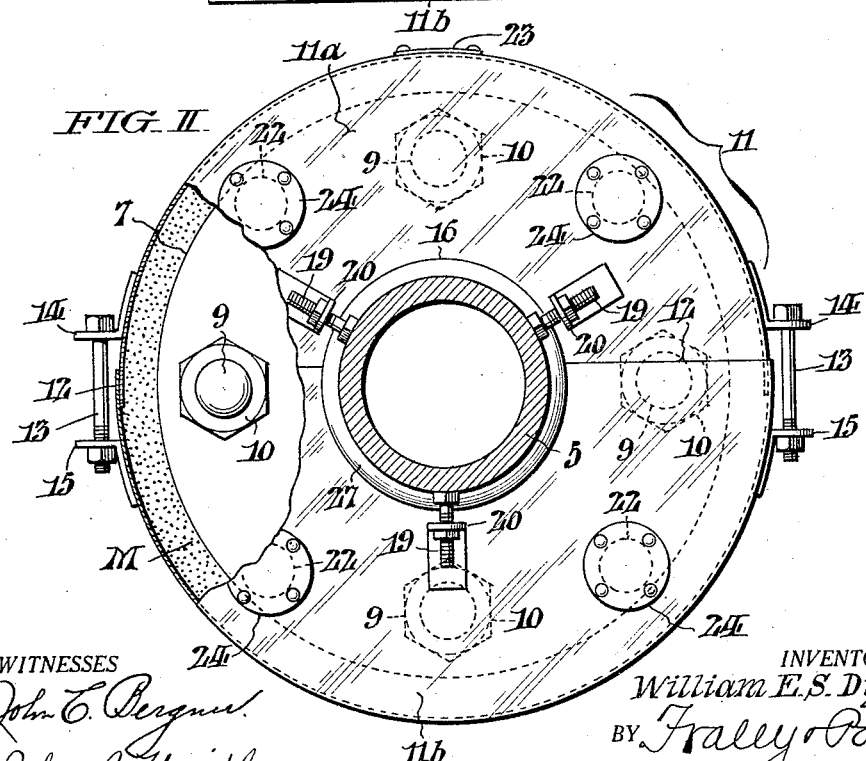
WITNESSES
INVENTOR:
William E. S. Dyer,
BY
ATTORNEYS.

Patented Feb. 7, 1933

1,896,225

UNITED STATES PATENT OFFICE

WILLIAM E. S. DYER, OF NOBLE, PENNSYLVANIA

EXPANSION EQUALIZING MEANS FOR PIPE JUNCTURES

Application filed April 18, 1931. Serial No. 531,129.

This invention relates to means for equalizing expansion in flanged junctures of pipe lines used in conducting fluids at high temperatures and pressures.

Ordinarily, in high pressure pipe systems where the juncture flanges of adjoining pipe sections and the flange clamp bolts are relatively heavy and bulky, uneven expansion takes place with fluctuation of temperature, that is to say: the piping responds more quickly to expansion and contraction than the connecting flanges under variant temperature influence. This is especially true, for example, in initiating flow of steam through a cold pipe line when the central portions of the flanges, in immediate contact with the adjoining pipe sections, will expand much more rapidly than their peripheral portions. Under such conditions, excessive strains are set up in the pipe flanges as well as in the bolts by which the flanges are clamped together; and flange ruptures and joint leakage are frequently traceable to this cause. Attempts have been made heretofore to obviate the difficulty by leaving the nuts of the clamp bolts somewhat loose with the idea of compensating for uneven expansion of the flanges, but this scheme has been found impracticable since it also invariably results in leakage of the pipe juncture when contraction takes place.

The purpose of my invention is to overcome the above recited drawbacks through provision of a simple, inexpensive and easily applicable expansion equalizing means capable of quickly and uniformly transmitting heat from the connecting pipe sections to all parts of the juncture flanges and the flange bolts, with effective reduction of stresses likely to result in fracture.

In the drawing hereunto attached, Fig. I is an illustration partly in side elevation and partly in longitudinal section, of a conventional flange pipe juncture fitted with my improved expansion equalizing means; and, Fig. II is an end view of the organization with a portion broken out to expose important details of my invention.

With more specific reference to these illustrations, 5 and 6 designate two connecting pipe sections; 7 and 8, the pipe flanges; 9, the flange clamp bolts; and 10, the nuts associated with said clamp bolts.

The means which I have devised for insuring equal expansion in all the parts of such a juncture under variant pressures and temperatures, comprises a cylindric casing 11 of sheet metal, which completely envelops the juncture flanges 7 and 8, as well as contiguous portions of the pipe sections 5 and 6. To facilitate its application over the flange juncture, the casing 11 is split diametrically, or, in other words, it comprises two substantially counterpart semi-circular components 11a and 11b which interlap as at 12 along the region of meeting. The two casing components 11a, 11b it will be noted, are clamped together by screw bolts 13 at each side of the juncture; and as shown, these screw bolts 13 pass through pierced lugs 14, 15 which are welded or otherwise permanently secured to the casing components 11a, 11b respectively. The pipe openings 16 in the end walls 17 and 18 of the casing 11 are made somewhat larger in diameter than the pipes 5, 6 (see Fig. I) with provision of ample circumferential expansion clearances. By means of a number of radially-directed adjusting screws 19 which take into lugs 20 on the end walls 17 and 18, the casing 11 can be properly aligned axially with the pipe sections 5 and 6 incident to application, in a manner which will be readily apparent from Fig. II.

After applying the casing 11 as just explained, I fill it with a granular material M which is high in thermal conductivity, for example, copper, aluminum or iron filings or powders capable of quickly and uniformly transmitting heat from the pipe sections 5 and 6 to all portions of the flanges 7, 8 and the bolts 9 exposed within the casing. This material M, I introduce into the casing 11 after the latter has been applied to the piping, either through the circumferential holes indicated at 21 or through holes 22 in the end walls 17 and 18, depending as to whether the piping is horizontal or vertical. Incident to filling, I rock or shake the casing to insure close packing of the material around the enveloped parts of the pipe juncture; and after the casing is completely filled, I tighten up on the clamp screws 13, and close the filling holes 21 and 22 with cover plates 23 and 24. These cover plates 23 and 24 may be secured with capacity for removal, by any convenient means such as screws or the like. The circumferential clearances around the holes 16 in the end walls 17 and 18 of the casing for the pipe sections 5 and 6, I preferably seal with a suitable plastic cement as conventionally indicated at 27, 28. In practice, it is of course the intention to cover the casing 11 and the piping 5, 6 with insulation such as is ordinarily used in connection with steam pipe systems for the purposes of heat conservation.

From the foregoing it will be seen that the expansion equalizing means of my invention is very simple, and easy and inexpensive to construct, and to apply to the piping; and moreover that it is highly efficient in the function for which it is designed.

Having thus described my invention, I claim:

1. Expansion equalizing means for flanged pipe junctures, comprising a casing of counterpart interlapping components filled with material high in thermal conductivity to completely envelop the juncture flanges and the contiguous portions of the connecting pipe sections, and means for securing said components concentric to and in line with said sections.

2. Expansion equalizing means for flanged pipe junctures, comprising a casing of counterpart interlapping substantially semi-circular components jointly filled with material high in thermal conductivity to completely envelop the juncture flanges and the contiguous portions of the connecting pipe sections, and adjuster means for positioning said components concentric to and in axial alignment with said sections.

3. Expansion equalizing means for flanged pipe junctures, comprising a casing of counterpart interlapping substantially semi-circular components jointly filled with closely packed granular material of high thermal conductivity to completely envelop the juncture flanges and the contiguous portions of the connecting pipe sections, radially-directed adjuster means at the ends of said components for positioning the latter concentric, to said sections, and means for clamping the components securely together.

4. Expansion equalizing means for flanged pipe junctures, comprising a casing filled with material high in thermal conductivity to completely envelop the juncture flanges and the contiguous portions of the connecting pipe sections, said casing including counterpart diametrically split interlapping components for convenience of application over the juncture and having openings with closures through which the filling material may be introduced, radially-directed adjuster screws at the ends of the casing for positioning the latter concentric to and in axial alignment with the pipe juncture, and means for clamping the casing securely about said juncture.

5. An expansion equalizing means for flanged pipe junctures, comprising a casing of counterpart interlapping semi-circular components having end openings larger in diameter than that of the connected pipes to provide ample expansion clearances, means for securing the casing components together, radially-directed adjuster screws at the ends of the casing for positioning the latter concentric to and in axial alignment with the pipe juncture, plastic means sealing the expansion clearances, and an opening or openings in the casing wall having closure means whereby said casing is filled with closely packed granular material of high thermal conductivity to completely envelop the pipe juncture.

In testimony whereof, I have hereunto signed my name at Philadelphia, Pennsylvania, this 17th day of April, 1931.

WILLIAM E. S. DYER.